(12) United States Patent
Sugihara et al.

(10) Patent No.: US 11,916,409 B2
(45) Date of Patent: Feb. 27, 2024

(54) POWER TRANSMITTING DEVICE AND POWER TRANSMITTING METHOD

(71) Applicant: TOYODA GOSEI CO., LTD., Kiyosu (JP)

(72) Inventors: Atsushi Sugihara, Kiyosu (JP); Shinichiro Fuki, Kiyosu (JP); Kazuhito Kawamura, Kiyosu (JP); Yuki Tokuyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/150,882

(22) Filed: Jan. 6, 2023

(65) Prior Publication Data

US 2023/0291245 A1    Sep. 14, 2023

(30) Foreign Application Priority Data

Feb. 1, 2022   (JP) ................................. 2022-014256

(51) Int. Cl.
*H02J 50/80* (2016.01)
*H02J 7/00* (2006.01)
*H02J 50/90* (2016.01)

(52) U.S. Cl.
CPC .......... *H02J 50/80* (2016.02); *H02J 7/00045* (2020.01); *H02J 7/007188* (2020.01); *H02J 50/90* (2016.02)

(58) Field of Classification Search
CPC ..................................................... H02J 50/80
See application file for complete search history.

(56) References Cited

U.S. PATENT DOCUMENTS

2014/0346885 A1\* 11/2014 Walley .................... H02J 50/12
                                                                 307/104
2015/0324798 A1\* 11/2015 Kai ....................... G06Q 20/145
                                                                 705/40
2016/0127012 A1    5/2016 Shylendra et al.
2016/0156388 A1    6/2016 Zeine et al.
(Continued)

FOREIGN PATENT DOCUMENTS

JP          6725531 B2      7/2020

*Primary Examiner* — Daniel Kessie
(74) *Attorney, Agent, or Firm* — POSZ LAW GROUP, PLC

(57) ABSTRACT

A power transmitting device includes a power transmission unit using contactless power supply, processing circuitry configured to switch a power transmission mode of the power transmission unit between a normal output mode and a limit mode, and a transmission-side communication unit configured to execute communication with a power receiving device. The processing circuitry is configured to determine whether the power receiving device is a registered power receiving device based on information related to the power receiving device obtained from the transmission-side communication unit, determine whether the registered power receiving device is located inside a power transmission range of the power transmission unit, set the power transmission mode to the normal output mode when determining that the registered power receiving device is located inside the range, and set the power transmission mode to the limit mode when determining that the registered power receiving device is not located inside the range.

6 Claims, 2 Drawing Sheets

(56) References Cited

U.S. PATENT DOCUMENTS

| | | |
|---|---|---|
| 2016/0299210 A1 | 10/2016 | Zeine |
| 2016/0299549 A1 | 10/2016 | Zeine et al. |
| 2016/0300547 A1 | 10/2016 | El-Rukby et al. |
| 2016/0301217 A1 | 10/2016 | Zeine et al. |
| 2016/0301240 A1 | 10/2016 | Zeine et al. |
| 2016/0301243 A1 | 10/2016 | Zeine et al. |
| 2016/0301255 A1 | 10/2016 | Zeine |
| 2016/0301256 A1 | 10/2016 | Zeine et al. |
| 2016/0301258 A1 | 10/2016 | Zeine et al. |
| 2016/0301259 A1 | 10/2016 | Zeine et al. |
| 2016/0301264 A1 | 10/2016 | Zeine et al. |
| 2017/0041046 A1 | 2/2017 | Shylendra et al. |
| 2017/0111347 A1* | 4/2017 | Kim ............... B60L 53/126 |
| 2017/0141620 A1 | 5/2017 | Zeine et al. |
| 2017/0141621 A1 | 5/2017 | Zeine et al. |
| 2017/0187231 A1 | 6/2017 | Zeine et al. |
| 2017/0187249 A1 | 6/2017 | Zeine et al. |
| 2017/0217319 A1* | 8/2017 | Araki ............... H02J 50/12 |
| 2018/0255596 A1 | 9/2018 | Zeine et al. |
| 2018/0259615 A1 | 9/2018 | Zeine |
| 2018/0366085 A1 | 12/2018 | Zeine et al. |
| 2018/0375388 A1* | 12/2018 | Byun ............... H02J 7/02 |
| 2019/0013703 A1* | 1/2019 | Shichino ........... H02J 50/60 |
| 2019/0020199 A1 | 1/2019 | Zeine et al. |
| 2019/0140490 A1 | 5/2019 | Zeine et al. |
| 2019/0157915 A1 | 5/2019 | Zeine et al. |
| 2019/0197984 A1 | 6/2019 | Zeine et al. |
| 2019/0199404 A1 | 6/2019 | Shylendra et al. |
| 2019/0305604 A1 | 10/2019 | Zeine et al. |
| 2020/0177028 A1* | 6/2020 | Esteban ............ H02J 50/12 |
| 2020/0296780 A1 | 9/2020 | Zeine et al. |
| 2020/0303954 A1 | 9/2020 | Zeine et al. |
| 2021/0049975 A1 | 2/2021 | El-Rukby et al. |
| 2021/0063525 A1 | 3/2021 | Zeine |
| 2021/0249903 A1 | 8/2021 | Zeine et al. |
| 2021/0249908 A1 | 8/2021 | Zeine et al. |
| 2021/0321472 A1 | 10/2021 | Zeine et al. |
| 2021/0373117 A1 | 12/2021 | Zeine |

* cited by examiner

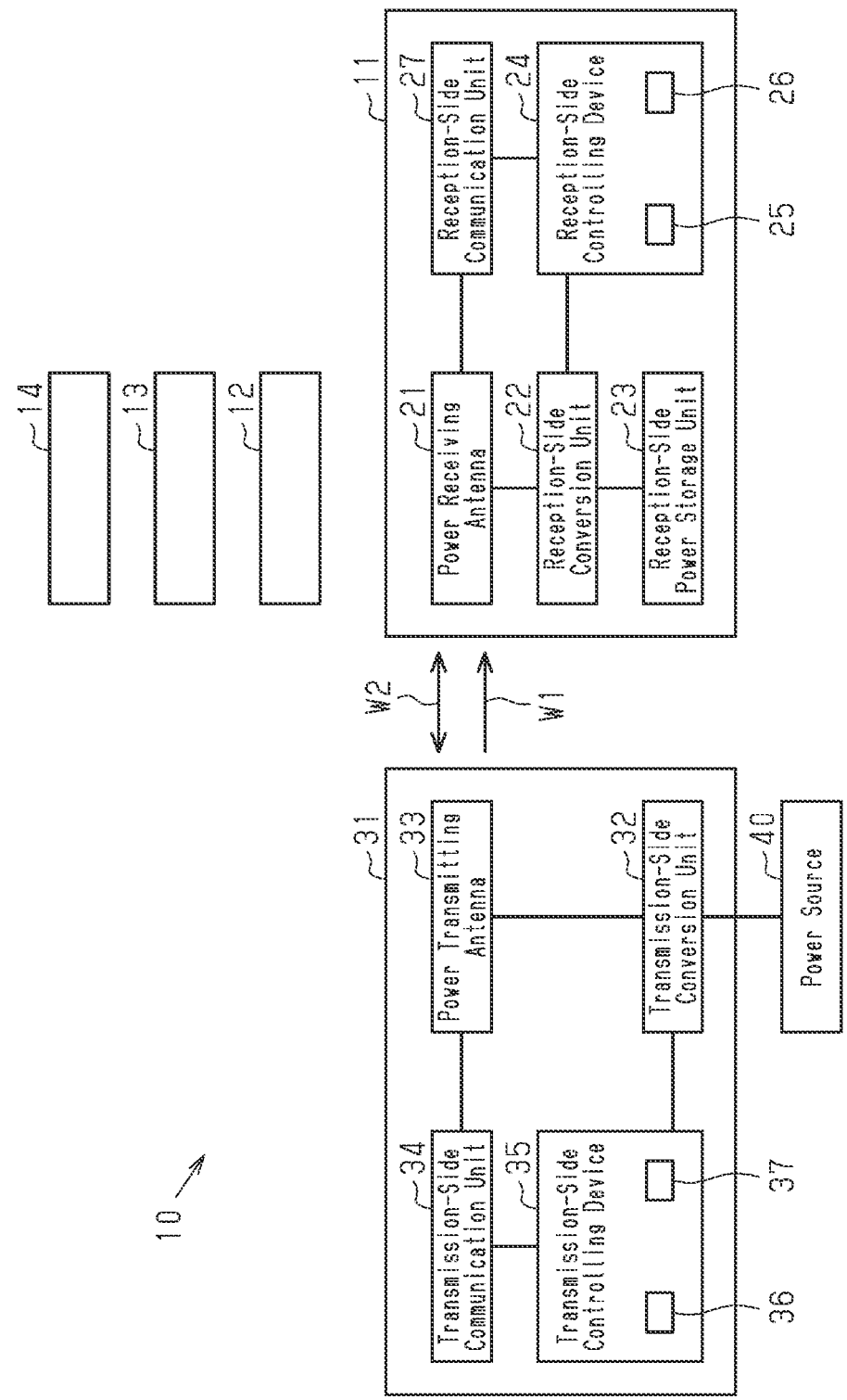

POWER TRANSMITTING DEVICE AND POWER TRANSMITTING METHOD

BACKGROUND

1. Field

The present disclosure relates to a power transmitting device and a power transmitting method.

2. Description of Related Art

A typical contactless power supply system includes a power transmitting device and a power receiving device. The power transmitting device transmits power through contactless power supply. The power receiving device receives the power transmitted from the power transmitting device.

When the power consumption of the power receiving device is relatively small, the power obtained through power transmission from the power transmitting device may be greater than the power consumption. In this case, if the transmission of power that is excessively greater than the power consumption continues, a relatively large amount of the transmitted power may be wasted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a power transmitting device that transmits power to a power receiving device. The power transmitting device includes a power transmission unit configured to transmit power to the power receiving device through contactless power supply, processing circuitry configured to switch a power transmission mode of the power transmission unit between a normal output mode and a limit mode in which a transmitted power is more limited than in the normal output mode, and a transmission-side communication unit configured to execute communication with the power receiving device. The processing circuitry is configured to determine whether the power receiving device is a registered power receiving device based on information related to the power receiving device obtained from the transmission-side communication unit, the registered power receiving device having been registered in advance, determine whether the registered power receiving device is located inside a power transmission range of the power transmission unit, set the power transmission mode to the normal output mode when determining that the registered power receiving device is located inside the power transmission range, and set the power transmission mode to the limit mode when determining that the registered power receiving device is not located inside the power transmission range.

Another aspect of the present disclosure provides a power transmitting method for transmitting power to a power receiving device. The power transmitting method includes transmitting power to the power receiving device through contactless power supply, switching a power transmission mode used to transmit the power between a normal output mode and a limit mode in which a transmitted power is more limited than in the normal output mode, and executing communication with the power receiving device. Switching the power transmission mode includes determining whether the power receiving device is a registered power receiving device based on information related to the power receiving device obtained through the communication, the registered power receiving device having been registered in advance, determining whether the registered power receiving device is located inside a power transmission range that allows the power receiving device to be supplied with power through the contactless power supply, setting the power transmission mode to the normal output mode when determining that the registered power receiving device is located inside the power transmission range, and setting the power transmission mode to the limit mode when determining that the registered power receiving device is not located inside the power transmission range.

Other features and aspects will be apparent from the following detailed description, the drawings, and the claims.

BRIEF DESCRIPTION OF DRAWINGS

FIG. 1 is a schematic diagram of a contactless power supply system.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 3:
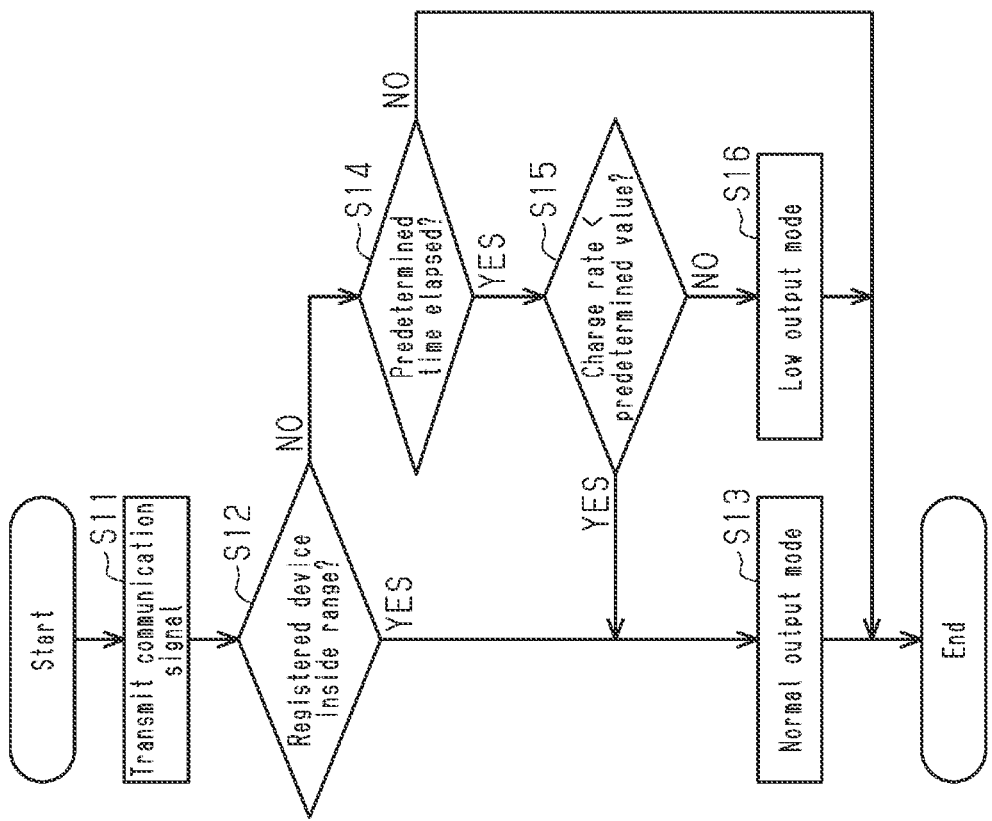
FIG. 3 is a flowchart illustrating power transmission control executed by the transmission-side controlling device of the contactless power supply system shown in FIG. 1.

This description provides a comprehensive understanding of the methods, devices, and/or systems described. Modifications and equivalents of the methods, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification. "at least one of A and B" should be understood to mean "only A, only B, or both A and B."

A power transmitting device 31 according to an embodiment will now be described.

Contactless Power Supply System 10

As shown in FIG. 1, a contactless power supply system 10 includes power receiving devices 11, 12, 13, 14 and the power transmitting device 31. In the contactless power supply system 10, the power transmitting device 31 executes contactless power supply using a power transfer signal W1 for the power receiving devices 11, 12, 13, 14. The power transfer signal W1 is a wireless signal transmitted from the power transmitting device 31 toward the power receiving devices 11, 12, 13, 14. The power transfer signal W1 of the present embodiment includes microwaves.

Power Receiving Devices 11, 12, 13, 14

The power receiving device 11 includes a power receiving antenna 21, a reception-side conversion unit 22, a reception-side power storage unit 23, a reception-side controlling device 24, and a reception-side communication unit 27. Although not shown for illustrative purposes, the power receiving devices 12, 13, 14 also have a hardware configuration similar to that of the power receiving device 11. The power receiving devices 11, 12, 13, 14 may be any devices that are activated when supplied with power. Examples of such devices include toys, lighting devices, smartphones, and wearable terminals. The power receiving devices 11, 12, 13, 14 are used in a space (e.g., a passenger compartment or a room) where a person can enter or exit.

The present embodiment includes four power receiving devices 11, 12, 13, 14. This example will now be described. The four power receiving devices 11, 12, 13, 14 include one registered power receiving device 11. The other power receiving devices 12, 13, 14 are non-registered power receiving devices. The registered power receiving device is a power receiving device in which the power receiving devices 11, 12, 13, 14 consume larger amounts of power when the power receiving device 11 is the registered power receiving device 11 than when the power receiving device 11 is not the registered power receiving device 11. When there are four power receiving devices as in the present embodiment, the total power consumption of the four power receiving devices 11, 12, 13, 14 including the registered power receiving device 11 is larger than the total power consumption of the four power receiving devices without the registered power receiving device 11.

The registered power receiving device 11 is, for example, a mobile communication terminal carried by a person. The mobile communication terminal may be, for example, a smartphone or a wearable terminal. When a person is not located inside a space where a person can enter or exit, the power receiving devices 12, 13, 14 are not used by a person. Thus, when a person is not located inside the space where a person can enter or exit, the power consumption of the power receiving devices 12, 13, 14 may be relatively small although power is consumed through standby power. In contrast, when a person is located inside a space where a person can enter or exit, the power receiving devices 12, 13, 14 are used by a person. The use of the power receiving devices 11, 12, 13, 14 by a person includes the use of a device by a person via a mobile communication terminal, such as a device capable of communicating with a mobile communication terminal. The device capable of communicating with a mobile communication terminal may be, for example, a router or a speaker. As described above, when a person is located inside a space where a person can enter or exit, the power receiving devices 11, 12, 13, 14 consume larger amounts of power. The presence of the registered power receiving device 11 inside the space can be interpreted as the presence of a person inside the space.

Power Receiving Antenna 21

The power receiving antenna 21 is configured to receive the power transfer signal W1. Examples of the power receiving antenna 21 may include a monopole antenna, a dipole antenna, a helical antenna, a parabolic antenna, or an antenna array including multiple antennas. The power receiving antenna 21 converts the power transfer signal W1 into AC power. The power receiving antenna 21 is configured to transmit and receive a communication signal W2. The power receiving antenna 21 that receives the power transfer signal W1 and an antenna that transmits and receives the communication signal W2 may be separately disposed.

Reception-Side Conversion Unit 22

The reception-side conversion unit 22 converts the AC power output from the power receiving antenna 21 into received power. The received power refers to the power obtained by the power receiving devices 11, 12, 13, 14 from the power transfer signal W1. The received power is DC power. The reception-side conversion unit 22 may have any form and include, for example, a rectifying circuit and a smoothing circuit.

Reception-Side Power Storage Unit 23

The reception-side power storage unit 23 is a power source for the power receiving devices 11, 12, 13, 14. Examples of the reception-side power storage unit 23 may include a rechargeable battery (e.g., a lithium-ion rechargeable battery) or a capacitor. The reception-side power storage unit 23 stores some of or all of the received power that has been converted by the reception-side conversion unit 22. In this manner, the power transfer signal W1 is used so that the power receiving devices 11, 12, 13, 14 receive power.

The reception-side power storage unit 23 includes a battery management system (BMS), which is not shown in the drawings. The BMS is configured to obtain the state of charge of the reception-side power storage unit 23. The state of charge may be a charge rate of the reception-side power storage unit 23. The state of charge may be a parameter (e.g., the open-circuit voltage of the reception-side power storage unit 23) that correlates with the state of charge of the reception-side power storage unit 23. The state of charge in the present embodiment is a charge rate.

Reception-Side Controlling Device 24

The reception-side controlling device 24 includes a processor 25 and a memory 26. The memory 26 includes a random access memory (RAM) and a read-only memory (ROM). The memory 26 stores program codes or instructions configured to cause the processor 25 to execute processes. The memory 26, or computer-readable medium, includes any type of medium that is accessible by general-purpose computers or dedicated computers. The reception-side controlling device 24 may include a hardware circuit such as an application-specific integrated circuit (ASIC) or a field-programmable gate array (FPGA). The reception-side controlling device 24, which is processing circuitry, may include one or more processors that run according to a computer program, one or more hardware circuits (e.g., ASIC or FPGA), or a combination thereof.

The memory 26 stores identification information that is related to the power receiving devices 11, 12, 13, 14. The identification information is an ID code individually set for the power receiving devices 11, 12, 13, 14. Thus, the power receiving devices 11, 12, 13, 14 each have different identification information.

Reception-Side Communication Unit 27

The reception-side communication unit 27 communicates with the power transmitting device 31 by transmitting and receiving the communication signal W2. The reception-side communication unit 27 demodulates the communication signal W2 received by the power receiving antenna 21, and outputs it to the reception-side controlling device 24. The reception-side communication unit 27 transmits, from the power receiving antenna 21, the communication signal W2 in which the data output by the reception-side controlling device 24 is modulated. The communication signal W2 of the present embodiment is a beacon signal. The communication using the communication signal W2 may be executed in any mode that conforms to a communication standard such as Bluetooth (registered trademark), Wi-Fi, or ZigBee (registered trademark).

The communication signal W2 transmitted from the reception-side communication unit 27 include information related to the state of charge of the reception-side power storage unit 23 and the identification information of the power receiving devices 11, 12, 13, 14. The information related to the state of charge of the reception-side power storage unit 23 is, for example, the charge rate of the reception-side power storage unit 23 that can be obtained by the BMS of the reception-side power storage unit 23. By receiving the communication signal W2, the power transmitting device 31 obtains the state of charge of the reception-side power storage unit 23.

Power Transmitting Device 31

The power transmitting device 31 executes contactless power supply using the power transfer signal W1 for the power receiving devices 11, 12, 13, 14. The power transmitting device 31 includes a transmission-side conversion unit 32, a power transmitting antenna 33, a transmission-side communication unit 34, and a transmission-side controlling device 35.

Transmission-Side Conversion Unit 32

The transmission-side conversion unit 32 converts power supplied from a power source 40 into an electric signal corresponding to the power transfer signal W1, and outputs the electric signal. The electric signal may have any form such as voltage, current, or power. The transmission-side conversion unit 32 may have any configuration. For example, the transmission-side conversion unit 32 includes a circuit including a switching element, such as a chopper circuit. The transmission-side conversion unit 32 outputs the DC power supplied from the power source 40 as an electric signal of AC power by controlling the switching element of the transmission-side conversion unit 32. That is, the transmission-side conversion unit 32 functions as a DC/AC inverter. The transmission-side conversion unit 32 includes a power conversion unit that supplies power to the transmission-side controlling device 35. The transmission-side conversion unit 32 supplies the transmission-side controlling device 35 with the power required to drive the transmission-side controlling device 35.

The power source 40 only needs to supply power to the transmission-side conversion unit 32. The power source 40 may be, for example, a system power source, a power storage device, or a power generator. The power storage device may be a rechargeable battery (e.g., a lithium-ion rechargeable battery) or a capacitor. The power source 40 may be a combination of two or more devices selected from the system power source, the power storage device, and the power generator.

Power Transmitting Antenna 33

The power transmitting antenna 33 is configured to transmit the power transfer signal W1 to the power receiving devices 11, 12, 13, 14. The power transmitting antenna 33 converts the electric signal output from the transmission-side conversion unit 32 into the power transfer signal W1, and transmits the power transfer signal W1. Examples of the power transmitting antenna 33 may include a monopole antenna, a dipole antenna, a helical antenna, a parabolic antenna, or an antenna array including multiple antennas. The power transmitting antenna 33 of the present embodiment is a phased array antenna including multiple antennas. The power transmitting antenna 33 converts the power output from the transmission-side conversion unit 32 into the power transfer signal W1, and transmits the power transfer signal W1 through wireless communication. This allows the power transmitting device 31 to supply a transmitted power to the power receiving devices 11, 12, 13, 14. The transmitted power refers to the power transmitted as the power transfer signal W1. The power transmitting antenna 33 is configured to transmit and receive the communication signal W2. The power transmitting antenna 33 that transmits the power transfer signal W1 and an antenna that transmits and receives the communication signal W2 may be separately disposed.

Transmission-Side Communication Unit 34

The transmission-side communication unit 34 is configured to transmit and receive the communication signal W2. Specifically, the transmission-side communication unit 34 demodulates the communication signal W2 received by the power transmitting antenna 33, and outputs it to the transmission-side controlling device 35. The transmission-side communication unit 34 transmits, from the power transmitting antenna 33, the communication signal W2 modulated based on the data output by the transmission-side controlling device 35. Thus, the power transmitting device 31 and the power receiving devices 11, 12, 13, 14 are configured to communicate with each other using the communication signal W2.

Transmission-Side Controlling Device 35

The transmission-side controlling device 35, which corresponds to processing circuitry, includes a processor 36 and a memory 37. The hardware configuration of the transmission-side controlling device 35 is, for example, similar to that of the reception-side controlling device 24. The memory 37 includes a rewritable storage medium. Such a storage medium may be, for example, an electrically erasable programmable read-only memory (EEPROM) or a flash memory. The memory 37 stores identification information of the registered power receiving device 11. A user can store the identification information in the memory 37. For example, the user controls the registered power receiving device 11 to cause the registered power receiving device 11 to transmit a request signal. The request signal includes identification information of the registered power receiving device 11 and a command for requesting the transmission-side controlling device 35 to store the identification information in the memory 37. Upon receiving the request signal via the transmission-side communication unit 34, the transmission-side controlling device 35 stores the identification information of the registered power receiving device 11 in the memory 37. In a case in which the power transmitting device 31 includes an auxiliary storage device, the identification information of the registered power receiving device 11 may be stored in the auxiliary storage device. The auxiliary storage device may be, for example, a hard disk drive or a solid-state drive. That is, the identification information of the registered power receiving device 11 may be stored in any type of storage medium as long as the storage medium is readable by the transmission-side controlling device 35.

The transmission-side controlling device 35 can adjust the transmitted power. The transmission-side controlling device 35 can control the transmitted power by, for example, controlling the power transmitting antenna 33. When the power transmitting antenna 33 is a phased array antenna, the transmitted power can be adjusted by adjusting the number of antennas that transmit power. The transmitted power may be adjusted by controlling the transmission-side conversion unit 32 to adjust the power input to the power transmitting antenna 33. The transmission-side controlling device 35 can adjust the transmitted power by controlling at least one of the transmission-side conversion unit 32 and the power transmitting antenna 33. The transmission-side conversion unit 32 and the power transmitting antenna 33 correspond to a power transmission unit.

Power Transmission Mode

The transmission-side controlling device 35 can switch a power transmission mode of the power transmission unit between multiple transmission modes. The transmission-side controlling device 35 adjusts the transmitted power in accordance with the power transmission mode. The power transmission mode includes a normal output mode and a limit mode. The normal output mode is a power transmission mode in which the transmitted power is not limited. In the normal output mode, for example, predefined transmitted power is output. The magnitude of the transmitted power may vary according to the power received from the power source 40. The limit mode is a mode in which the transmitted power is more limited than in the normal output mode. Limiting the transmitted power includes a manner in which the transmitted power is not transmitted. The limit mode of the present embodiment is a low output mode. The low output mode is a power transmission mode that produces a smaller amount of transmitted power than the normal output mode. The transmitted power in the low output mode is set, for example, such that the received power is slightly larger than the total power consumption of the three power receiving devices 12, 13, 14 when the registered power receiving device 11 is not located inside the power transmission range. The user may be able to set the transmitted power in the low output mode. When the power transmitting device 31 includes an operation part that can be operated by the user, the transmitted power in the low output mode may be set using the operation part. When the power transmitting device 31 can be controlled using a mobile communication terminal carried by the user, the transmitted power in the low output mode may be set using the mobile communication terminal.

Power Receiving Control by Power Receiving Devices 11, 12, 13, 14

The power receiving control executed by the power receiving devices 11, 12, 13, 14 will now be described. The power receiving control is repeatedly executed in a predetermined control cycle.

Step S1

Figure 2:
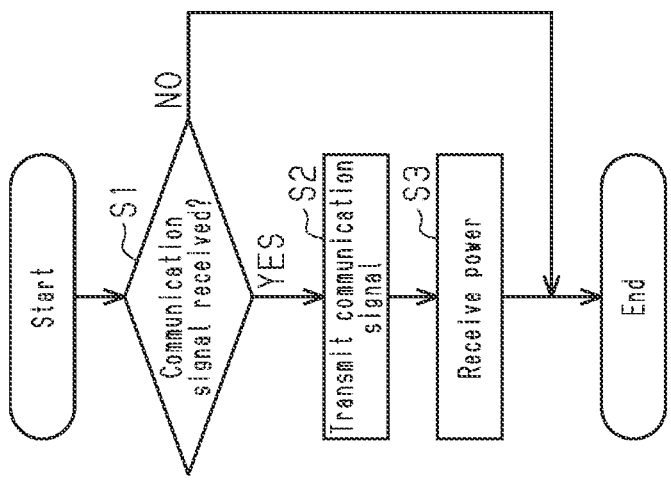
FIG. 2 is a flowchart illustrating power receiving control executed by the reception-side controlling device of the contactless power supply system shown in FIG. 1.

As shown in FIG. 2, the reception-side controlling device 24 determines in step S1 whether the communication signal W2 from the power transmitting device 31 has been received. When receiving the communication signal W2 from the power transmitting device 31, the reception-side controlling device 24 executes the process of step S2. When receiving no communication signal W2 from the power transmitting device 31, the reception-side controlling device 24 ends the power receiving control.

Step S2

In step S2, the reception-side controlling device 24 transmits the communication signal W2. Specifically, the reception-side controlling device 24 outputs, to the reception-side communication unit 27, data including the charge rate of the reception-side power storage unit 23 and the identification information. The reception-side communication unit 27 transmits the communication signal W2 that has been modulated based on the data. As a result, the communication signal W2 including the charge rate of the reception-side power storage unit 23 and the identification information is transmitted.

Step S3

Next, in step S3, the reception-side controlling device 24 obtains the received power from the power transfer signal W1 transmitted from the power transmitting device 31. Specifically, the reception-side controlling device 24 obtains the received power from the power transfer signal W1 by controlling the reception-side conversion unit 22. By transmitting the communication signal W2 in step S2, the power transfer signal W1 is transmitted from the power transmitting device 31 to the power receiving devices 11, 12, 13, 14. Thus, the received power is obtained from the power transfer signal W1. The received power is supplied to the reception-side power storage unit 23. Accordingly, the reception-side power storage unit 23 is charged.

Power Transmission Control by Power Transmitting Device 31

The transmission-side controlling device 35 switches the power transmission mode between the normal output mode and the low output mode. The power transmission control executed by the transmission-side controlling device 35 for switching the power transmission mode will now be described. The power transmission control is repeatedly executed in a predetermined control cycle.

Step S11

As shown in FIG. 3, in step S11, the transmission-side controlling device 35 transmits the communication signal W2 from the transmission-side communication unit 34.

Step S12

Next, in step S12, the transmission-side controlling device 35 determines whether the registered power receiving device 11 is located inside a power transmission range of the power transmission unit. Specifically, the transmission-side controlling device 35 determines whether the registered power receiving device 11 is located inside the power transmission range by determining whether the power receiving devices 11, 12, 13, 14 correspond to the registered power receiving device 11, which has been registered in advance, based on the identification information of the power receiving devices 11, 12, 13, 14 obtained from the transmission-side communication unit 34. The power transmission range is a range in which the power receiving devices 11, 12, 13, 14 can be supplied with power using the power transfer signal W1. When the transmission-side controlling device 35 transmits the communication signal W2 in step S11, the communication signal W2 is returned from the power receiving devices 11, 12, 13, 14 that have received the communication signal W2. The transmission-side controlling device 35 obtains, from the transmission-side communication unit 34, data in which the returned communication signal W2 is demodulated. This allows the transmission-side controlling device 35 to obtain the information related to the power receiving devices 11, 12, 13, 14 from the transmission-side communication unit 34. The transmission-side controlling device 35 determines whether the registered power receiving device 11 is located inside the power transmission range from the information related to the power receiving devices 11, 12, 13, 14. The communication signal W2 includes the identification information of the power receiving devices 11, 12, 13, 14. This allows the transmission-side controlling device 35 to determine whether the registered power receiving device 11 is located inside the power transmission range from the identification information. In other words, the transmission-side controlling device 35 determines whether the registered power receiving device 11 is included in the power receiving devices 11, 12, 13, 14 located inside the power transmission range.

The transmission-side controlling device 35 checks the identification information obtained by demodulating the communication signal W2 with the identification information of the registered power receiving device 11 stored in the memory 37. When receiving the communication signal W2 including identification information that matches the identification information stored in the memory 37, the transmission-side controlling device 35 determines that the registered power receiving device 11 is located inside the power transmission range. When obtaining a return from the power receiving devices 12, 13, 14 other than the registered power receiving device 11 (i.e., from non-registered power receiving devices), the transmission-side controlling device 35 determines that the registered power receiving device 11 is not located inside the power transmission range. When obtaining a return from the registered power receiving device 11, the transmission-side controlling device 35 determines that the registered power receiving device 11 is located inside the power transmission range. The transmission-side controlling device 35 may determine that the registered power receiving device 11 is located inside the power transmission range when a return is obtained from the registered power receiving device 11 and the registered power receiving device 11 is located inside a predetermined range. Based on the communication signal W2 from the registered power receiving device 11, the transmission-side controlling device 35 obtains the position of the registered power receiving device 11. The communicable range using the communication signal W2 may be different from the power transmission range. In such a case, the transmission-side controlling device 35 properly determines whether the registered power receiving device 11 is located inside the power transmission range by determining that the registered power receiving device 11 is located inside the power transmission range when the registered power receiving device 11 is located inside the predetermined range. The predetermined range is similar to the power transmission range. When the determination result of step S12 is affirmative, that is, when the registered power receiving device 11 is determined as being located inside the power transmission range, the transmission-side controlling device 35 executes the control of step S13. When the determination result of step S12 is negative, that is, when it is determined that the registered power receiving device 11 is not located inside the power transmission range, the transmission-side controlling device 35 executes the determination of step S14.

Step S13

In step S13, the transmission-side controlling device 35 sets the power transmission mode to the normal output mode. Specifically, in a case in which the power transmission mode is the normal output mode at the point in time when the process of step S13 is executed, the transmission-side controlling device 35 maintains the normal output mode. In a case in which the power transmission mode is the low output mode at the point in time when the process of step S13 is executed, the transmission-side controlling device 35 switches the low output mode to the normal output mode. When the process of step S13 is completed, the transmission-side controlling device 35 ends the power transmission control.

Step S14

In step S14, the transmission-side controlling device 35 determines whether the result of the determination that the registered power receiving device 11 is not located inside the power transmission range continues for a predetermined time or longer. When the determination result in step S12 is negative, the transmission-side controlling device 35 counts the elapsed time. When the determination result of step S12 is affirmative (e.g., when the determination result of step S12 is affirmative in a control cycle subsequent to the control cycle in which the determination result of step S12 was negative), the elapsed time is reset. The transmission-side controlling device 35 determines whether the elapsed time is greater than the predetermined time; that is, whether the predetermined time has elapsed. In a case in which the predetermined time has elapsed, the transmission-side controlling device 35 determines that the result of the determination that the registered power receiving device 11 is not located inside the power transmission range continues for the predetermined time or longer. The predetermined time may be set to any time. For example, the predetermined time is set so as to prevent the determination result of step S14 from being affirmative when it is determined that the registered power receiving device 11 is not located inside the power transmission range despite the presence of the registered power receiving device 11 inside the power transmission range. For example, there may potentially be a case in which due to an accidental communication failure between the power transmitting device 31 and the registered power receiving device 11, it is determined that the registered power receiving device 11 is not located inside the power transmission range despite the presence of the registered power receiving device 11 inside the power transmission range. In this case, the transmission-side controlling device 35 may determine that the registered power receiving device 11 is located inside the power transmission range for a relatively short time. The predetermined time may be set to be longer than a time in a case where it is temporarily determined that the registered power receiving device 11 is not located inside the power transmission range due to such an accidental communication failure. When the determination result of step S14 is negative, the transmission-side controlling device 35 ends the power transmission control. In this case, the power transmission mode is not switched. That is, power transmission is executed in the same power transmission mode as that in the last control cycle. When the determination result of step S14 is affirmative, the transmission-side controlling device 35 executes the determination of step S15.

Step S15

In step S15, the transmission-side controlling device 35 determines whether the charge rate of the reception-side power storage unit 23 of each of the power receiving devices 12, 13, 14 is less than a predetermined value. The predetermined value may be set to any value. The transmission-side controlling device 35 obtains the charge rate of the reception-side power storage unit 23 by receiving the communication signal W2 from the power receiving devices 12, 13, 14. When the charge rate of the reception-side power storage unit 23 of at least one of the power receiving devices 12, 13, 14 is less than the predetermined value, the transmission-side controlling device 35 makes an affirmative determination result of step S15. When the charge rates of the reception-side power storage units 23 of all the power receiving devices 12, 13, 14 are greater than or equal to the predetermined value, the transmission-side controlling device 35 makes a negative determination result of step S15. In the determination of step S15, it is determined whether the power receiving devices 12, 13, 14 include a power receiving device in which the charge rate of the reception-side power storage unit 23 is less than the predetermined value. Since the determination of step S15 is made when the determination result of step S12 is negative, it is determined whether the charge rate of the reception-side power storage unit 23 of each of the power receiving devices 12, 13, 14 other than the registered power receiving device 11 is less than the predetermined value. When the determination result of step S15 is affirmative, the transmission-side controlling device 35 executes the process of step S13. When the determination result of step S15 is negative, the transmission-side controlling device 35 executes the control of step S16.

Step S16

In step S16, the transmission-side controlling device 35 sets the power transmission mode to the low output mode. Specifically, in a case in which the power transmission mode is the low output mode at the point in time when the process of step S16 is executed, the transmission-side controlling device 35 maintains the low output mode. In a case in which the power transmission mode is the normal output mode at the point in time when the process of step S16 is executed, the transmission-side controlling device 35 switches the normal output mode to the low output mode.

Operation

The operation of the present embodiment will now be described.

When a person carrying the registered power receiving device 11 is not located inside a space where a person can enter and exit, the registered power receiving device 11 is not located inside the space. In this case, the power transmission mode of the power transmitting device 31 is set to the low output mode. When the person carrying the registered power receiving device 11 is located inside the space, the registered power receiving device 11 is located inside the space. In this case, the power transmission mode of the power transmitting device 31 is set to the normal output mode.

Advantages

The advantages of the present embodiment will now be described.

(1) The transmission-side controlling device 35 determines whether the registered power receiving device 11 is located inside the power transmission range. The transmission-side controlling device 35 sets the power transmission mode to the normal output mode when determining that the registered power receiving device 11 is located inside the power transmission range. When the registered power receiving device 11 is located inside the power transmission range, the power receiving devices 11, 12, 13, 14 including the registered power receiving device 11 consume larger amounts of power. At this time, the power transmission mode is set to the normal output mode so as to prevent the received power at the power receiving devices 11, 12, 13, 14 from being insufficient. The power receiving device 11, which requires the transmitted power in the normal output mode, is registered as the registered power receiving device 11. This allows for power transmission in the normal output mode when the transmitted power in the normal output mode is required. The transmission-side controlling device 35 sets the power transmission mode to the low output mode when determining that the registered power receiving device is not located inside the power transmission range. The power receiving devices 12, 13, 14 consume lower amounts of power when the registered power receiving device 11 is not located inside the power transmission range than when it is located inside that range. At this time, the power transmission mode is set to the low output mode so as to prevent the received power at the power receiving devices 12, 13, 14 from being excessively larger than the power consumption at the power receiving devices 12, 13, 14. The power receiving devices 12, 13, 14, which do not require the transmitted power in the normal output mode, are not registered as registered power receiving devices. Thus, the transmission-side controlling device 35 sets the power transmission mode to the low output mode when the registered power receiving device 11 is not located inside the power transmission range. This limits the transmitted power. As compared with when the power transmission mode is constantly maintained at the normal output mode, the transmitted power is prevented from being wasted. Accordingly, the power transmitting device 31 efficiently supplies power to the power receiving devices 11, 12, 13, 14.

(2) The transmission-side controlling device 35 sets the power transmission mode to the low output mode when the result of the determination that the registered power receiving device 11 is not located inside the power transmission range continues for a predetermined time or longer. Due to a communication failure or the like, it may be potentially determined that the registered power receiving device 11 is not located inside the power transmission range despite the presence of the registered power receiving device 11 inside the power transmission range. For example, when the transmission-side communication unit 34 fails to receive the communication signal W2 from the registered power receiving device 11 or when the data transmitted from the registered power receiving device 11 has an error, it may be potentially determined that the registered power receiving device 11 is not located inside the power transmission range despite the presence of the registered power receiving device 11 inside the power transmission range. The power transmission mode is prevented from being set to the low output mode despite the presence of the registered power receiving device 11 inside the power transmission range by setting the power transmission mode to the low output mode when that the result of the determination that the registered power receiving device 11 is not located inside the power transmission range continues for the predetermined time or longer, as compared with a case in which the power transmission mode is immediately set to the low output mode when it is determined that the registered power receiving device 11 is not located inside the power transmission range.

(3) In a case where the charge rate of the reception-side power storage unit 23 is less than a predetermined value, the transmission-side controlling device 35 sets the power transmission mode to the normal output mode even when the registered power receiving device 11 is not located inside the power transmission range. When the charge rate of the reception-side power storage unit 23 is less than the predetermined value, the remaining capacity of the reception-side power storage unit 23 may run out. In such a case, the remaining capacity of the reception-side power storage unit 23 is prevented from running out by charging the reception-side power storage unit 23 in the normal output mode. Further, since the received power is used to charge the reception-side power storage unit 23, the transmitted power is prevented from being wasted.

(4) The limit mode is the low output mode. Even when the registered power receiving device 11 is not located inside the power transmission range, the power receiving devices 12, 13, 14 consume power through standby power or the like. By setting the limit mode to the low output mode and transmitting power even when the registered power receiving device 11 is not located inside the power transmission range, the remaining capacity of the reception-side power storage unit 23 is prevented from running out. This prevents situations in which the power receiving devices 12, 13, 14 stop operating due to power shortage.

Modifications

The above embodiment may be modified as follows. The embodiment and the following modifications can be combined as long as the combined modifications remain technically consistent with each other.

The limit mode may be a stop mode. The stop mode is a power transmission mode in which power transmission by the power transmitting device 31 is stopped.

The limit mode may include the stop mode and the low output mode. For example, when the registered power receiving device is not located inside the power transmission range, a user may be permitted to select in advance whether to set the power transmission mode to the stop mode or the low output mode. The transmission-side controlling device 35 may set the power transmission mode to the low output mode when the registered power receiving device 11 is not located inside the power transmission range and the charge rate of the reception-side power storage unit 23 is less than a predetermined value. The transmission-side controlling device 35 may set the power transmission mode to the stop mode when the registered power receiving device 11 is not located inside the power transmission range and the charge rate of the reception-side power storage unit 23 is greater than or equal to the predetermined value.

Switching from the normal output mode to the low output mode may be executed by switching the power source 40, which is connected to the transmission-side conversion unit 32. In this case, the power source 40 includes two power sources each having a different rated output. The power transmitting device 31 includes a switch used to switch a connection destination of the transmission-side conversion unit 32 to one of the two power sources. When the power transmission mode is the normal output mode, the transmission-side controlling device 35 controls the switch so as to connect the power source having the larger rated output of the two power sources to the transmission-side conversion unit 32. When the power transmission mode is the low output mode, the transmission-side controlling device 35 controls the switch so as to connect the power source having the smaller rated output of the two power sources to the transmission-side conversion unit 32. Changes in the power received by the transmission-side conversion unit 32 allow for adjustment of the transmitted power. In this case, the transmission-side conversion unit 32 receives a smaller amount of power in the low output mode. This prevents the transmitted power from being wasted.

In the power receiving control, the reception-side controlling device 24 may transmit the communication signal W2 to the power transmitting device 31 before executing the process of step S1. In this case, it is determined in step S1 whether the communication signal W2 produced by the response of the power transmitting device 31 has been received. Alternatively, step S1 may be omitted and the processes of steps S2 and S3 may be executed in the power receiving control. That is, the power receiving control by the power receiving devices 11, 12, 13, 14 and the power transmission control by the power transmitting device 31 may be started by transmitting the communication signal W2 from the power receiving devices 11, 12, 13, 14.

The transmission-side controlling device 35 does not have to execute the determination in step S14. In this case, when the determination result of step S12 is negative, the transmission-side controlling device 35 may execute the determination of step S15.

The transmission-side controlling device 35 does not have to execute the determination in step S15. In this case, when the determination result of step S14 is affirmative, the transmission-side controlling device 35 may execute the determination of step S16.

The transmission-side controlling device 35 does not have to execute the determinations of steps S14 and S15. In this case, when the determination result of step S12 is negative, the transmission-side controlling device 35 may execute the determination of step S16.

The transmission-side controlling device 35 may execute the determination of step S15 prior to step S12. When the determination result of step S15 is affirmative, the transmission-side controlling device 35 executes the process of step S13. When the determination result of step S15 is negative, the transmission-side controlling device 35 executes the determination of step S12. In this case, before it is determined whether the registered power receiving device 11 is located inside the power transmission range, it is determined whether the charge rate of the reception-side power storage unit 23 of each of the power receiving devices 12, 13, 14 other than the registered power receiving device 11 is less than a predetermined value. When the charge rate of the reception-side power storage unit 23 is less than the predetermined value, the power transmission mode is set to the normal output mode regardless of whether the registered power receiving device 11 is located inside the power transmission range.

The power transmitting device 31 may include a display at a position visible to the user. The display may show information related to power transmission (e.g., power transmission mode or transmitted power).

There may be multiple power transmitting devices 31. In this case, the power transmitting devices 31 are configured to communicate with each other in a wired or wireless manner. When the transmission-side controlling device 35 of one of the power transmitting devices 31 determines that the registered power receiving device 11 is located inside the power transmission range, each power transmitting device 31 is notified that the registered power receiving device 11 is located inside the power transmission range. This causes the power transmission mode of each power transmitting device 31 to be set to the normal output mode. When the transmission-side controlling device 35 of one of the power transmitting devices 31 determines that the registered power receiving device 11 is not located inside the power transmission range, each power transmitting device 31 is notified that the registered power receiving device 11 is not located inside the power transmission range. This causes the power transmission mode of each power transmitting device 31 to be set to the low output mode. In such a manner, when multiple power transmitting devices 31 are disposed, at least one of the power transmitting devices 31 needs to determine whether the registered power receiving device 11 is located inside the power transmission range.

The contactless power supply system 10 may supply power using an electromagnetic induction method, a magnetic field resonance method, or an electric field resonance method.

The registered power receiving device 11 may consume a larger amount of power than the power receiving devices 12, 13, 14, which are non-registered power receiving devices other than the registered power receiving device 11.

There may be multiple registered power receiving devices 11.

The registered power receiving device may be registered by a manufacturer that manufactures the power transmitting device 31. For example, in a case in which a mobile communication terminal carried by a person is registered as a registered power receiving device, it is likely to be determined whether the power receiving device is a mobile communication terminal based on a protocol used for communication of the mobile communication terminal. The manufacturer that manufactures the power transmitting device 31 may make settings for the power transmitting device 31 so as to determine, as the registered power receiving device, a power receiving device that executes communication with the protocol used for communication of the mobile communication terminal. When a frame format defined by the protocol includes a frame that indicates the type of the power receiving device, the manufacturer that manufactures the power transmitting device 31 may make settings for the power transmitting device 31 so as to determine, as the registered power receiving device, a specific type of the power receiving device. In this case, the protocol or frame corresponds to the information related to the power receiving device.

The reception-side controlling devices 24 of the power receiving devices 12, 13, 14, which are non-registered power receiving devices other than the registered power receiving device 11, may transmit the communication signal W2 less frequently when the power transmission mode is the low output mode than when the power transmission mode is the normal output mode. Whether the power transmitting device 31 is in the low output mode is determined by including information indicating the power transmission mode in the communication signal W2 transmitted by the power transmitting device 31.

The power receiving devices 11, 12, 13, 14 do not have to each include the reception-side power storage unit 23. In this case, the power receiving devices 11, 12, 13, 14 may be operated by power from the reception-side conversion unit 22.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A power transmitting device that transmits power to a power receiving device, the power transmitting device comprising:
   a power transmission unit configured to transmit power to the power receiving device through contactless power supply;
   processing circuitry configured to switch a power transmission mode of the power transmission unit between a normal output mode and a limit mode in which a transmitted power is more limited than in the normal output mode; and
   a transmission-side communication unit configured to execute communication with the power receiving device,
   wherein the processing circuitry is configured to:
      determine whether the power receiving device is a registered power receiving device based on information related to the power receiving device obtained from the transmission-side communication unit, the registered power receiving device having been registered in advance and including a mobile communication terminal carried by a person;
      determine whether the registered power receiving device is located inside a power transmission range of the power transmission unit;
      set the power transmission mode to the normal output mode when determining that the registered power receiving device is located inside the power transmission range; and
      set the power transmission mode to the limit mode when determining that the registered power receiving device is not located inside the power transmission range, and
   wherein the power transmission unit includes a phased array antenna including multiple antennas configured to transmit a power transfer signal to the power receiving device, the power transfer signal being microwaves.

2. The power transmitting device according to claim 1, wherein the processing circuitry is configured to set the power transmission mode to the limit mode when a result of a determination that the registered power receiving device is not located inside the power transmission range continues for a predetermined time or longer.

3. The power transmitting device according to claim 1, wherein the limit mode is a low output mode that produces a smaller amount of the transmitted power than the normal output mode.

4. The power transmitting device according to claim 1, wherein the processing circuitry is configured to determine whether the registered power receiving device is located inside the power transmission range by determining whether the power receiving device is the registered power receiving device based on the information related to the power receiving device obtained from the transmission-side communication unit.

5. A power transmitting method for transmitting power to a power receiving device, the power transmitting method comprising:
   transmitting power to the power receiving device through contactless power supply;
   switching a power transmission mode used to transmit the power between a normal output mode and a limit mode in which a transmitted power is more limited than in the normal output mode; and
   executing communication with the power receiving device,
   wherein switching the power transmission mode includes:
      determining whether the power receiving device is a registered power receiving device based on information related to the power receiving device obtained through the communication, the registered power receiving device having been registered in advance and including a mobile communication terminal carried by a person;
      determining whether the registered power receiving device is located inside a power transmission range that allows the power receiving device to be supplied with power through the contactless power supply;
      setting the power transmission mode to the normal output mode when determining that the registered power receiving device is located inside the power transmission range; and setting the power transmission mode to the limit mode when determining that the registered power receiving device is not located inside the power transmission range, and wherein transmitting power to the power receiving device includes transmitting a power transfer signal to the power receiving device by a phased array antenna including multiple antennas, the power transfer signal being microwaves.

6. A power transmitting device that transmits power to a power receiving device, the power transmitting device comprising:

a power transmission unit configured to transmit power to the power receiving device through contactless power supply;

processing circuitry configured to switch a power transmission mode of the power transmission unit between a normal output mode and a limit mode in which a transmitted power is more limited than in the normal output mode; and a transmission-side communication unit configured to execute communication with the power receiving device, wherein the power receiving device includes a reception-side power storage unit that corresponds to a power source, and wherein the processing circuitry is configured to:
- determine whether the power receiving device is a registered power receiving device based on information related to the power receiving device obtained from the transmission-side communication unit, the registered power receiving device having been registered in advance;
- determine whether the registered power receiving device is located inside a power transmission range of the power transmission unit;
- set the power transmission mode to the normal output mode when determining that the registered power receiving device is located inside the power transmission range;
- set the power transmission mode to the limit mode when determining that the registered power receiving device is not located inside the power transmission range and that a charge rate of the reception-side power storage unit of a power receiving device other than the registered power receiving device is greater than or equal to a predetermined value, the power receiving device other than the registered power receiving device being located inside the power transmission range; and
- set the power transmission mode to the normal output mode when determining that the registered power receiving device is not located inside the power transmission range and that the charge rate of the reception-side power storage unit of the power receiving device other than the registered power receiving device is less than the predetermined value, the power receiving device other than the registered power receiving device being located inside the power transmission range.

* * * * *